United States Patent
Beger et al.

(10) Patent No.: US 8,298,367 B2
(45) Date of Patent: Oct. 30, 2012

(54) PRESSURE SENSITIVE ADHESIVES AND METHODS FOR THEIR PREPARATION

(75) Inventors: Andrew Beger, Elizabethtown, KY (US); Loren Lower, Sanford, MI (US); Timothy Lueder, Midland, MI (US); Rochelle Nesbitt, Caro, MI (US); Randall Schmidt, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 625 days.

(21) Appl. No.: 11/921,283

(22) PCT Filed: Jul. 6, 2006

(86) PCT No.: PCT/US2006/026387
§ 371 (c)(1),
(2), (4) Date: Dec. 17, 2008

(87) PCT Pub. No.: WO2007/011538
PCT Pub. Date: Jan. 25, 2007

(65) Prior Publication Data
US 2009/0294023 A1    Dec. 3, 2009

Related U.S. Application Data

(60) Provisional application No. 60/701,766, filed on Jul. 19, 2005.

(51) Int. Cl.
| | |
|---|---|
| *B29C 65/00* | (2006.01) |
| *B32B 17/00* | (2006.01) |
| *B32B 37/00* | (2006.01) |
| *C03C 27/00* | (2006.01) |
| *C04B 37/00* | (2006.01) |
| *C08K 9/00* | (2006.01) |
| *C08F 283/00* | (2006.01) |
| *C08F 283/12* | (2006.01) |
| *C08G 77/00* | (2006.01) |
| *C08G 77/38* | (2006.01) |
| *C08L 83/00* | (2006.01) |

(52) U.S. Cl. ........ 156/325; 156/106; 523/209; 525/477; 525/478

(58) Field of Classification Search ............ 156/106, 156/325; 523/209; 525/477, 478
See application file for complete search history.

(56) References Cited

U.S. PATENT DOCUMENTS
2,676,182 A    4/1954    Daudt et al
(Continued)

FOREIGN PATENT DOCUMENTS
CN    1074697 A    7/1993
(Continued)

OTHER PUBLICATIONS

WAUSAU Window and Wall Systems, Curtain wall product information guide, pp. C4-1-Z1-8, 2004.

(Continued)

*Primary Examiner* — Michael Orlando
(74) *Attorney, Agent, or Firm* — Howard & Howard Attorneys PLLC

(57) ABSTRACT

A pressure sensitive adhesive composition includes (A) a bodied MQ resin containing (i) a resinous core and (ii) a nonresinous polyorganosiloxane group, where the nonresinous polyorganosiloxane group is terminated with a silicon-bonded hydroxyl group; (B) a treated MQ resin, where (B)/(A) ratio has a value of 0.3 to 5.0, and (C) a polydiorganosiloxane terminated with a condensation reactable group; where resin/polymer ratio has a value of 2.0 to 3.0; optionally (D) a crosslinker; optionally (E) a catalyst; and optionally (F) a solvent. A pressure sensitive adhesive product prepared by curing the pressure sensitive adhesive composition is useful in structural attachment applications such as structural glazing applications.

15 Claims, 3 Drawing Sheets

U.S. PATENT DOCUMENTS

| | | | |
|---|---|---|---|
| 4,143,088 A | 3/1979 | Favre et al. | |
| 4,611,042 A | 9/1986 | Rivers-Farrell et al. | |
| 4,753,977 A | 6/1988 | Merrill | |
| 4,774,310 A | 9/1988 | Butler | |
| 4,950,344 A | 8/1990 | Glover et al. | |
| 4,962,076 A | 10/1990 | Chu et al. | |
| 5,051,455 A | 9/1991 | Chu et al. | |
| 5,053,442 A | 10/1991 | Chu et al. | |
| 5,281,455 A | 1/1994 | Braun et al. | |
| 5,300,171 A | 4/1994 | Braun et al. | |
| 5,436,303 A | 7/1995 | Lin | |
| 5,561,203 A * | 10/1996 | Strong et al. | 525/477 |
| 5,726,256 A | 3/1998 | Benson et al. | |
| 5,861,472 A | 1/1999 | Cifuentes et al. | |
| 5,869,556 A | 2/1999 | Cifuentes et al. | |
| 6,036,997 A | 3/2000 | Ragland et al. | |
| 2004/0075076 A1 | 4/2004 | Bhagwagar | |
| 2004/0221526 A1 | 11/2004 | Rinehurt et al. | |

FOREIGN PATENT DOCUMENTS

| | | |
|---|---|---|
| CN | 1477172 A | 2/2004 |
| EP | 0 537 784 | 4/1993 |
| EP | 0 664 328 B1 | 10/1997 |
| GB | 2 190 696 A | 11/1987 |
| TW | I308169 B | 4/2009 |
| WO | WO 2007-011540 A1 | 1/2007 |

OTHER PUBLICATIONS

Lauren Manufacturing, Black Closed Cell Silicone Sponge, Product Information Sheet.

English language abstract not available for CN 1074697; However, see English language equivalent US 5,436,303. Orginal Document extracted from the espacenet.com database on Aug. 8, 2012, 24 pages.

English language abstract for CN 1477172 extracted from the espacenet.com database on Aug. 8, 2012, 10 pages.

English language abstract not available for TWI308169; However, see English language equivalent US 2004/0075076. Orginal Document extracted from the espacenet.com database on Aug. 8, 2012, 32 pages.

* cited by examiner

PRESSURE SENSITIVE ADHESIVES AND METHODS FOR THEIR PREPARATION

CROSS REFERENCE TO RELATED APPLICATIONS

This application is a U.S. national stage filing under 35 U.S.C. §371 of PCT Application No. PCT/US06/026387 filed on 6 Jul. 2006, currently pending, which claims the benefit of U.S. Provisional Patent Application No. 60/701,766 filed 19 Jul. 2005 under 35 U.S.C. §119 (e). PCT Application No. PCT/US06/026387 and U.S. Provisional Patent Application No. 60/701,766 are hereby incorporated by reference.

TECHNICAL FIELD

This invention relates to a pressure sensitive adhesive composition useful for, inter alia, structural attachment applications. More particularly, this invention relates to a condensation reaction curable pressure sensitive adhesive composition that cures under ambient conditions and is useful in structural glazing applications.

BACKGROUND

Curable pressure sensitive adhesive compositions capable of curing at room temperature are known in the art and are commercially available. These pressure sensitive adhesive compositions find use in various nonstructural attachment applications. However, a drawback of these pressure sensitive adhesive compositions is that they may lack sufficient durability, sufficient peel strength and sufficient tensile strength to be used in structural attachment applications, such as structural glazing applications (e.g., curtain wall applications and insulating glass applications).

Structural glazing is typically performed by placing an uncured silicone sealant into a cavity formed by a spacer material, glass panel, and a metal frame. This system may suffer from drawbacks such as long times needed to cure the sealant before a prefabricated unit can be moved, high mullion width of the system due to the spacer, modest thermal resistance, and modest sound damping from the exterior. There is a continuing need in industry to improve performance in structural glazing applications.

SUMMARY

This invention relates to a pressure sensitive adhesive composition (PSAC). The PSAC comprises: (A) a bodied MQ resin comprising (i) a resinous core and (ii) a nonresinous polyorganosiloxane group, (B) a treated MQ resin, and (C) a polydiorganosiloxane terminated with a condensation reactable group.

DETAILED DESCRIPTION

All amounts, ratios, and percentages are by weight unless otherwise indicated. The following is a list of definitions, as used herein.

Definitions and Usage of Terms

"A" and "an" each mean one or more.

"Bodied MQ resin" means a siloxane having a structure comprising (i) a resinous core and (ii) a nonresinous polyorganosiloxane group, where the nonresinous polyorganosiloxane group is terminated with a silicon bonded hydroxyl group. The siloxane consists essentially of M, D, and Q units and has a hydroxyl group content of 0.5% to 2%.

"D" means a siloxane unit of the formula $R_2SiO_{2/2}$, where each R is independently a monovalent group.

"M" means a siloxane unit of the formula $R_3SiO_{1/2}$, where each R is independently a monovalent group.

"Q" means a siloxane unit of the formula $SiO_{4/2}$.

"PSAC" means pressure sensitive adhesive composition.

"PSAP" means pressure sensitive adhesive product, which is the result of curing a PSAC.

"Substituted" means one or more hydrogen atoms in a hydrocarbon group has been replaced with another substituent. Examples of such substituents include, but are not limited to, halogen atoms such as chlorine, fluorine, bromine, and iodine; halogen atom containing groups such as chloromethyl, perfluorobutyl, trifluoroethyl, and nonafluorohexyl; oxygen atoms; oxygen atom containing groups such as (meth)acrylic and carboxyl; nitrogen atoms; nitrogen atom containing groups such as amino-functional groups, amido-functional groups, and cyano-functional groups; sulfur atoms; and sulfur atom containing groups such as mercapto.

"T" means a siloxane unit of the formula $RSiO_{3/2}$, where R is a monovalent group.

"Treated MQ resin" means a siloxane consisting essentially of M and Q units and having a hydroxyl group content of 0% to 2%.

PSAC

This invention relates to a PSAC comprising:
(A) a bodied MQ resin comprising (i) a resinous core and (ii) a nonresinous polyorganosiloxane group,
(B) a treated MQ resin,
(C) a polydiorganosiloxane terminated with a condensation reactable group,
optionally (D) a crosslinker,
optionally (E) a catalyst, and
optionally (F) a solvent.

Components (A) and (B) MQ Resins

Component (A) comprises a bodied MQ resin comprising a resinous core and a nonresinous polyorganosiloxane group, and component (B) comprises a treated MQ resin. Components (A) and (B) may be prepared by methods known in the art.

An MQ resin comprises siloxane units of the formulae $R^1_3SiO_{1/2}$ and $SiO_{4/2}$, where each $R^1$ is independently a monovalent hydrocarbon group, a monovalent halogenated hydrocarbon group, a hydrogen atom, or a hydroxyl group. Examples of monovalent hydrocarbon groups for $R^1$ include, but are not limited to, alkyl such as methyl, ethyl, propyl, pentyl, octyl, undecyl, and octadecyl; cycloalkyl such as cyclohexyl; aryl such as phenyl, tolyl, xylyl, benzyl, and 2-phenylethyl. Examples of monovalent halogenated hydrocarbon groups for $R^1$ include, but are not limited to, chlorinated alkyl groups such as chloromethyl and chloropropyl groups and fluorinated alkyl groups such as 3,3,3-trifluoropropyl, 4,4,4,3,3-pentafluorobutyl, 5,5,5,4,4,3,3-heptafluoropentyl, and 6,6,6,5,5,4,4,3,3-nonafluorohexyl.

The MQ resin may have a ratio of M units to Q units (M:Q) of 0.5 to 1.2, alternatively 0.89:1 to 1:1. The MQ resin may have a number average molecular weight of 1,500 to 8,000, alternatively 5,000. The MQ resin may have a weight average molecular weight of 3,000 to 40,000, alternatively 15,000.

Methods of preparing MQ resins are known in the art. For example, a MQ resin may be prepared by treating a product produced by the silica hydrosol capping process of Daudt, et al. disclosed in U.S. Pat. No. 2,676,182. Briefly stated, the method of Daudt, et al. involves reacting a silica hydrosol under acidic conditions with a hydrolyzable triorganosilane such as trimethylchlorosilane, a siloxane such as hexamethyldisiloxane, or combinations thereof, and recovering a product comprising M and Q units (MQ resin). The resulting MQ resins may contain from 2 to 5 percent by weight of silicon-bonded hydroxyl groups.

A bodied MQ resin may be prepared from the MQ resin described above by methods known in the art, such as those disclosed in U.S. Pat. Nos. 5,726,256; 5,861,472; and 5,869,556. For example, the bodied MQ resin may be prepared by dissolving the MQ resin described above in a solvent, such as a solvent described below as component (F); heating the MQ resin in the presence of an acid or base catalyst and a polydiorganosiloxane terminated with silicon-bonded hydroxyl groups; and removing water. The resulting product of this process is (A) a bodied MQ resin comprising (i) a core and (ii) a polydiorganosiloxane group, where the polydiorganosiloxane group has a terminal silicon-bonded hydroxyl group. The bodied MQ resin may contain 0.5% to 2%, alternatively 0.75% to 1.25% hydroxyl groups.

Component (A) can be a single bodied MQ resin or a combination comprising two or more bodied MQ resins that differ in at least one of the following properties: hydroxyl group content, ratio of amount of component (A)(i) to component (A)(ii), siloxane units, and sequence. The ratio of the amount of component (A)(i) to amount of component (A)(ii) (the (A)(i)/(A)(ii) ratio) may be 1 to 2.5. The amount of component (A) added to the PSAC depends on various factors including resin/polymer ratio and (B)/(A) ratio, however, component (A) may be added to the PSAC in an amount of 10% to 50% based on the weight of the PSAC.

Component (B) may be prepared from the MQ resin described above by dissolving the MQ resin, a treating agent, and an acid catalyst in a solvent and heating the resulting combination until the hydroxyl content of the MQ resin is 0 to 2%, alternatively 0.5% to 1%. The treating agent may be a silane of the formula $R^2_3SiR^3$, where each $R^2$ is independently a monovalent hydrocarbon group such as methyl, vinyl, or phenyl, alternatively methyl; and $R^3$ is a group reactive with silanol. The acid catalyst may be trifluoroacetic acid. The solvent may be a solvent described below as component (F), such as xylene. The treating process reacts the $R^3$ substituted silicon atom a hydroxyl group in the MQ resin, thereby linking the $R^2_3Si$-group with a silicon atom in the MQ resin through a divalent oxygen atom and forming component (B).

Component (B) can be a single treated MQ resin or a combination comprising two or more treated MQ resins that differ in at least one of the following properties: average molecular weight, hydroxyl group content, and M:Q ratio. Component (B) may have a ratio of M units to Q units (M:Q) of 0.5 to 1.2, alternatively 0.89:1 to 1:1. Component (B) may have a number average molecular weight of 1,500 to 8,000, alternatively 5,000. Component (B) may have a weight average molecular weight of 3,000 to 40,000, alternatively 15,000. Component (B) may be added to the PSAC in an amount of 5% to 50% based on the weight of the PSAC.

The amounts of components (A) and (B) relative to each other are selected such that the ratio of the amount of component (B) to the amount of component (A) (the (B)/(A) ratio) may have a value of 0.3 to 5.0, alternatively 0.5 to 1.0. The (B)/(A) ratio may be calculated as follows. First, the amounts by weight of components (A) through (E) in the PSAC are normalized to 100% (excluding component (F) and any optional components other than components (D) and (E), if present). The normalized weight of component (B) is then divided by the normalized weight of component (A).

Component (C) Polydiorganosiloxane

Component (C) is a polydiorganosiloxane terminated with a condensation reactable group. Component (C) may comprise an α,ω-difunctional-polydiorganosiloxane of the formula $(R^5)_{3-y}R^4_ySiO—(R^4_2SiO)_x—SiR^4_y(R^5)_{3-y}$, where each $R^4$ is independently a monovalent organic group, each $R^5$ is independently a hydrolyzable substituent, x is an integer having a value of 200 to 1,000, and y is 0, 1, or 2; alternatively y is 0.

Suitable organic groups for $R^4$ include, but are not limited to, monovalent substituted and unsubstituted hydrocarbon groups. Examples of monovalent unsubstituted hydrocarbon groups for $R^4$ include, but are not limited to, alkyl such as methyl, ethyl, propyl, pentyl, octyl, undecyl, and octadecyl; cycloalkyl such as cyclohexyl; aryl such as phenyl, tolyl, xylyl, benzyl, and 2-phenylethyl. Examples of monovalent substituted hydrocarbon groups for $R^4$ include, but are not limited to, monovalent halogenated hydrocarbon groups such as chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocyclopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Examples of monovalent substituted hydrocarbon groups for $R^4$ include, but are not limited to, hydrocarbon groups substituted with oxygen atoms such as glycidoxyalkyl, and hydrocarbon groups substituted with nitrogen atoms such as aminoalkyl and cyano-functional groups such as cyanoethyl and cyanopropyl. Alternatively, each $R^4$ may be an alkyl group.

Suitable hydrolyzable substituents for $R^5$ include, but are not limited to, a halogen atom, an acetamido group, an acetoxy group, an acyloxy group, an alkoxy group, an amido group, an amino group, an aminoxy group, a hydroxyl group, an oximo group, a ketoximo group, a methylacetamido group, or an alkoxysilylhydrocarbylene group, and x is an integer having a value of 200 to 700.

Alternatively, each $R^4$ may be an alkyl group such as methyl, each $R^5$ may be a hydroxyl group, or a trialkoxysilethylene group, and x may have a value of 500 to 700.

Alkoxysilylhydrocarbylene-endblocked polydiorganosiloxanes may be prepared by reacting a vinyl-terminated, polydimethylsiloxane with (alkoxysilylhydrocarbyl)tetramethyldisiloxane. Alkoxysilylhydrocarbylene-endblocked polydiorganoosiloxanes are known in the art and are disclosed in U.S. Pat. Nos. 4,962,076; 5,051,455; and 5,053,442. Suitable alkoxysilylhydrocarbylene-endblocked polydiorganosiloxanes may have the formula:

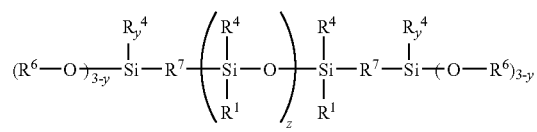

where $R^4$ is as described above; each $R^6$ is independently an alkyl group such as methyl, ethyl, propyl, or butyl; each $R^7$ is a divalent hydrocarbon group or a combination of a divalent hydrocarbon group and a divalent siloxane group; each y is independently 0, 1, or 2; and z has a value of 200 to 1,000.

$R^7$ may be an alkylene group such as ethylene, propylene, or hexylene; an arylene group such as phenylene, or an alkylarylene group such as:

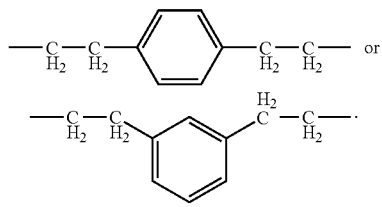

Alternatively, each $R^4$ may be methyl, each $R^6$ may be methyl, each $R^7$ may be ethylene, and y may be 0.

Component (C) can be a single polydiorganosiloxane or a combination comprising two or more polydiorganosiloxanes that differ in at least one of the following properties: average molecular weight, siloxane units, sequence, and viscosity. The amount of component (C) in the PSAC may have a value of 5% to 25% based on the weight of the PSAC.

Components (A), (B), and (C) are selected such that a ratio of the combined amounts of components (A)(i) and (B) to the combined amounts of components (A)(ii) and (C) (the resin/polymer ratio) may have a value of 2.0 to 3.0, alternatively 2.2 to 2.5. The resin/polymer ratio may be calculated as follows. First, the amounts by weight of components (A) through (E) in the PSAC are normalized to 100% (excluding component (F) and any other optional components). The amount of resin is calculated by multiplying the weight fraction of component (i) in component (A) by the normalized amount by weight of component (A) and adding the product to the normalized amount by weight of component (B). The amount of polymer is calculated by multiplying the weight fraction of component (ii) in component (A) by the normalized amount by weight of component (A) and adding the product to the normalized amount by weight of component (C). The resin/polymer ratio is then calculated by dividing the amount of resin by the amount of polymer.

Optional Component (D) Crosslinker

Component (D) is an optional crosslinker that may be added in an amount of 0 to 20% based on the weight of the PSAC, alternatively 0.5% to 20%. Component (D) may be a silane, an oligomeric reaction product of the silane, or a combination thereof. The silane may have formula $R^8_{(4-a)}SiR^9_a$, where each $R^8$ independently represents a monovalent organic group, each $R^9$ independently represents a hydrolyzable substituent, and subscript a has a value of 2 to 4, alternatively 3 to 4. Alternatively, the optional crosslinker may be an oligomeric reaction product having formula: $R^8Si(OSi(OR^9)_3)_3$.

Suitable organic groups for $R^8$ include, but are not limited to, monovalent substituted and unsubstituted hydrocarbon groups. Examples of monovalent unsubstituted hydrocarbon groups for $R^8$ include, but are not limited to, alkyl such as methyl, ethyl, propyl, pentyl, octyl, undecyl, and octadecyl; cycloalkyl such as cyclohexyl; aryl such as phenyl, tolyl, xylyl, benzyl, and 2-phenylethyl. Examples of monovalent substituted hydrocarbon groups for $R^8$ include, but are not limited to, monovalent halogenated hydrocarbon groups such as chlorinated alkyl groups such as chloromethyl and chloropropyl groups; fluorinated alkyl groups such as fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl; chlorinated cycloalkyl groups such as 2,2-dichlorocycliopropyl, 2,3-dichlorocyclopentyl; and fluorinated cycloalkyl groups such as 2,2-difluorocyclopropyl, 2,3-difluorocyclobutyl, 3,4-difluorocyclohexyl, and 3,4-difluoro-5-methylcycloheptyl. Examples of monovalent substituted hydrocarbon groups for $R^8$ include, but are not limited to, hydrocarbon groups substituted with oxygen atoms such as glycidoxyalkyl, and hydrocarbon groups substituted with nitrogen atoms such as aminoalkyl and cyano-functional groups such as cyanoethyl and cyanopropyl. Alternatively, each $R^8$ may be an alkyl group.

Examples of hydrolyzable substituents for $R^9$ include, but are not limited to, halogen atoms, acetamido groups, acetoxy groups, acyloxy groups, alkoxy groups, amido groups, amino groups, aminoxy groups, oximo groups, ketoximo groups, and methylacetamido groups. Alternatively, each $R^9$ may be an alkoxy group. Suitable alkoxy groups for $R^9$ include, but are not limited to, methoxy, ethoxy, propoxy, and butoxy.

The alkoxysilanes for component (D) may include dialkoxysilanes, trialkoxysilanes, tetraalkoxysilanes, and combinations thereof. Component (D) may comprise a dialkoxysilane selected from chloromethylmethyldimethoxysilane, chloromethylmethyldiethoxysilane, dimethyldimethoxysilane, methyl-n-propyldimethoxysilane, (2,2-dichlorocyclopropyl)-methyldimethoxysilane, (2,2-difluorocyclopropyl)-methyldiethoxysilane, (2,2-dichlorocyclopropyl)-methyldiethoxysilane, fluoromethylmethyldiethoxysilane, fluoromethylmethyldimethoxysilane, or a combination thereof.

Component (D) may comprise a trialkoxysilane selected from methyltrimethoxysilane, ethyltrimethoxysilane, propyltrimethoxysilane, isobutyltrimethoxysilane, cyclopentyltrimethoxysilane, hexyltrimethoxysilane, phenyltrimethoxysilane, 2-ethyl-hexyltrimethoxysilane, 2,3-dimethylcyclohexyltrimethoxislane, glycidoxypropyltrimethoxysilane, arninoethylaminopropyltrimethoxysilane, (ethylenediaminepropyl)trimethoxysilane, 3-methacryloxypropyltrimethoxysilane, chloromethyltrimethoxysilane, 3-chloropropyltrimethoxysilane, trichlorophenyltrimethoxysilane, 3,3,3-trifluoropropyl trimethoxysilane, 4,4,4,3,3-pentafluorobutyltrimethoxysilane, 2,2-difluorocyclopropyltriethoxysilane, methyltriethoxysilane, cyclohexyltriethoxysilane, chloromethyltriethoxysilane, tetrachlorophenyltriethoxysilane, fluoromethyltriethoxysilane, methyltriisopropoxysilane, methyltriacetoxysilane, ethyltricetoxysilane, methyl-tris(methoxyethyl)silane, n-propyl-tris(3-methoxyethoxy)silane, phenyltris-(methoxyethoxy)silane, vinyltrimethoxysilane, or a combination thereof.

Component (D) may comprise a tetraalkoxysilane selected from tetraethoxysilane, tetrapropoxysilane, tetrabutoxysilane, or a combination thereof.

Alternatively, each $R^9$ may be a ketoximo group. Examples of ketoximosilanes for component (D) include, but are not limited to, tetra(methylethylketoximo)silane, methyl-tris-(methylethylketoximo)silane, vinyl-tris-(methylethylketoximo)silane, and combinations thereof. When component (D) comprises a ketoximosilane, then a catalyst may not be needed.

Optional Component (E) Catalyst

Component (E) is an optional catalyst. The catalyst may be any catalyst that facilitates condensation reaction. The catalyst may be a Lewis acid; a primary, secondary, or tertiary organic amine; a metal oxide; a titanium compound; a tin compound; a zirconium compound; or a combination thereof. Suitable catalysts are known in the art and are exemplified by the catalysts described in U.S. Pat. No. 4,753,977 at col. 4, line 35 to col. 5, line 57. The amount of component (E)

depends on various factors including the type of catalyst selected and the choice of the remaining components in the composition, however the amount of component (E) may be 0% to 1.5%, alternatively 0.5% to 1.5% based on the weight of the PSAC.

Component (E) may comprise a titanium catalyst. Suitable titanium catalysts include organofunctional titanates, siloxytitanates, and combinations thereof. Organofunctional titanates are exemplified by 1,3-propanedioxytitanium bis(ethylacetoacetate); 1,3-propanedioxytitanium bis(acetylacetonate); diisopropoxytitanium bis(acetylacetonate); 2,3-di-isopropoxy-bis(ethylacetate) titanium; titanium naphthenate; tetrapropyltitanate; tetrabutyltitanate; tetraethylhexyltitanate; tetraphenyltitanate; tetraoctadecyltitanate; tetrabutoxytitanium; tetraisopropoxytitanium; ethyltriethanolaminetitanate; a betadicarbonyltitanium compound such as bis(acetylacetonyl) diisopropyltitanate; or a combination thereof. Other organofunctional titanates are exemplified by those in U.S. Pat. No. 4,143,088 at col. 7, line 15 to col. 10, line 35. Siloxytitanates are exemplified by tetrakis(trimethylsiloxy) titanium, bis(trimethylsiloxy)bis(isopropoxy)titanium, or a combination thereof.

The catalyst may comprise a tin compound. Suitable tin compounds are exemplified by dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin dineodeconoate; triethyl tin tartrate; dibutyl tin dibenzoate; tin oleate; tin naphthenate; butyltintri-2-ethylhexoate; tin butyrate; or a combination thereof.

The catalyst may comprise a zirconium compound. Suitable zirconium compounds are exemplified by zirconium octoate.

Optional Component (F) Solvent

Component (F) is an optional solvent that does not interfere with the curing reaction. Component (F) may comprise an organic solvent, an unreactive silicone fluid solvent, or a combination thereof. Organic solvents include, but are not limited to a hydrocarbon liquid exemplified by an aromatic hydrocarbon such as benzene, toluene, xylene, or a combination thereof; or an aliphatic hydrocarbon such as hexane, heptane, cyclohexane, or a combination thereof. Alternatively, the organic solvent may be a halogenated hydrocarbon such as a chlorocarbon or an oxygenated hydrocarbon such as an ester, e.g., ethyl acetate, an ether, e.g., dibutyl ether, a ketone, e.g., methylisobutyl ketone, an alcohol, e.g., methanol or ethanol, or a combination thereof. Alternatively, component (F) may comprise xylene. Unreactive silicone fluid solvents for component (F) include a cyclic polydiorganosiloxane such as cyclopolydimethylsiloxane, a linear polydiorganosiloxane such as hexamethyldisiloxane, or a combination thereof. The amount of component (F) may range from 0% to 80% based on the weight of the PSAC, alternatively 30% to 70%.

Other Optional Components

Other optional components may be added to the composition provided that the optional component and the amount in which it is added do not materially adversely affect the properties of the PSAC and the PSAP. Examples of such optional components that may be added in addition to components (A) through (F) include adhesion promoters, fillers (such as glass balloons, glass fibers, ground glass, calcium carbonate, silica, talc, or combinations thereof), fungicides, pigments, or combinations thereof.

Methods of Making the PSAC

The components of the PSAC may be combined in any manner such as in bulk or in a solvent. Due to the high viscosities of some of the components, the PSAC is conveniently prepared by mixing the components in a solvent. Mixing may be performed by any technique known in the art such as milling, blending, or stirring. Mixing may be either in a batch or in a continuous process.

Components (A) through (C) and any optional components may be combined at ambient or elevated temperature, the resulting combination may be cooled. Alternatively, all components may be fed to a twin screw extruder, organic solvent may be removed, and thereafter an unreactive silicone fluid solvent may be added.

Uses for the PSAC

This invention further relates to a process comprising: (1) applying a PSAC to a support, and (2) removing some or all of component (F) from the PSAC. The process may further comprise (3) adhering the product of step (2) to a surface and (4) curing the product of step (2) to form a PSAP. Steps (3) and (4) may be performed concurrently or sequentially. The PSAC on each side of the support may be the same. Alternatively, different PSACs may be applied to different sides of the support. Alternatively, different PSACs may be applied to different portions of the support.

The support and surface can have any solid form and can comprise any material. Examples of suitable forms include decorative articles, devices and mechanical parts in elastomer, foam, flexible, or rigid consistency. Examples of suitable materials include ferrous and nonferrous metals, such as aluminum, copper, gold, iron, platinum, silver, tin, and their alloys, stainless steel; organic polymers such as polyolefins, polyesters, polyamides, polyacrylates, polyfluoroolefins; polyorganosiloxanes such as open cell silicone foam and closed cell silicone foam; primed (e.g., with a silicone adhesion promoter) and unprimed high performance paints such as polyvinylidene fluoride paints, acrylic thermoset paints, polyester powdercoat paints, polyurethane paints, and epoxy paints; cellulosic materials such as paper and wood; textile materials such as cotton and its blends; and siliceous materials such as glass, cement board, concrete, brick, ceramic such as porcelain, china, quartz; and crystal; and natural stones such as granite, marble, and slate.

For structural attachment applications, the support may comprise a silicone foam or a silicone elastomer. The silicone foam support may be a closed cell silicone foam. The closed cell silicone foam support may be an extrusion or a cut piece from a foam sheet. Closed cell silicone foam extrusions and sheets such as calendered sheets useful as the support are known in the art and are commercially available. A suitable silicone foam may be a calendered sheet or a closed cell silicone foam extrusion that may have density of 31 to 37 pounds per cubic foot (pcf) as measured by ASTM D 297 and compression deflection of 13 to 17 as measured by ASTM D 1056-00. Suitable silicone elastomers are known in the art and may have a durometer hardness of 25 to 70.

The PSAC and PSAP of this invention are useful in structural attachment media. For example, (1) the PSAC may be applied to opposite sides of a support, and (2) solvent may be removed from the PSAC until the product of step (1) is not tacky to touch, thereby forming layers on the opposite sides of the support. The solvent may be removed by exposure to ambient air for e.g., 5 to 30 minutes depending on ambient conditions. The product of step (2) is a pressure sensitive adhesive tape that may be used, for example, in structural attachment applications. The layer may have a thickness of at least 3 mils, alternatively 3 mils to 20 mils, alternatively 3 mils to 12 mils, alternatively 4 mils to 6 mils. Without wishing to be bound by theory, it is thought that if the thickness of the coating is less than 3 mils, the product will not exhibit sufficient adhesion for structural applications; and if the thickness of the coating is greater than 20 mils, the exposure time for solvent removal may have to be increased. Alternatively, release liners may be placed on either side of the tape and the resulting article frozen after step (2) and before step (3).

The method may further comprise: (3) interposing the pressure sensitive adhesive tape between substrates, (4) applying pressure to the pressure sensitive adhesive tape, and (5) curing the layers. Step (4) may be performed by any convenient means. When the pressure sensitive adhesive tape is used in a structural glazing application, clamps may be used to apply pressure. Curing may be performed by exposing the product of step (5) to ambient conditions (e.g., temperature and humidity) for an amount of time sufficient to adhere the pressure sensitive adhesive tape to the substrates. The exact time will depend on the conditions, however, time may be 1 hour to 24 hours, alternatively 4 hours to 24 hours. This invention may provide the benefit that a unit may be moved after curing for only 1 hour, or less.

Alternatively, the method may optionally further comprise an additional step of priming the support before step (1). The support may be primed by applying a PSAC of this invention to the support or by applying a different primer to the support. The PSAC used as a primer may be the same or different in composition than the PSAC used in step (1), however, the layer of PSAC applied as a primer may have a lesser thickness than the layer applied in step (1).

This invention further relates to a kit comprising: (I) the PSAC described above, (II) a support, and (III) an instruction set explaining how to apply component (I) to component (II) to prepare a tape and how to use the tape in a structural glazing application. The support can be a silicone foam or a silicone rubber.

A use of the pressure sensitive adhesive tape in a structural glazing application is illustrated in FIG. 1, showing construction of a curtain wall. A frame member 100 is a structural part of a building curtain wall. The curtain wall panels 101 and 102 are attached to the frame member 100 using the pressure sensitive adhesive tape 103 described above. The pressure sensitive adhesive tape includes a closed cell silicone foam support 105 bearing on opposing sides a coating of a pressure sensitive adhesive product 104 prepared by curing the PSAC of this invention after solvent removal. Optionally, an elastomeric backer rod 106 is placed between the panels 101 and 102, and a weather sealant 107 is extruded over the rod 106 to seal the space between the panels 101 and 102.

FIG. 2 shows an alternative use of the pressure sensitive adhesive tape 103 according to this invention. The pressure sensitive adhesive tape 103, which includes a closed cell silicone foam support 105 bearing on opposing sides a coating of a pressure sensitive adhesive product 104, is disposed as a spacer between glass panes 201 and 202 in an insulating glass unit.

FIGS. 3 and 4 illustrate improved appearance of a curtain wall unit. FIG. 3 shows a portion of a curtain wall unit of the prior art. The curtain wall unit includes a frame 301 having an insulating glass unit 302 mounted thereto. The insulating glass unit includes glass panes 303, 304 held apart a fixed distance from one another by spacer 305. The insulating glass unit 302 is mounted to the frame 301 through a temporary adhesive 306. The temporary adhesive 306 includes a support 307 coated on opposing sides with a nonstructural adhesive 308. A structural adhesive composition 309 is applied in the space between the temporary adhesive 306 and the frame 301.

FIG. 4 shows a portion of a curtain wall unit of this invention having an improved appearance. The curtain wall unit includes a frame 301 having an insulating glass unit 302 mounted thereto. The insulating glass unit includes glass panes 303, 304 held apart a fixed distance from one another by spacer 305. The insulating glass unit 302 is mounted to the frame 301 through a pressure sensitive adhesive tape 400 according to this invention. The pressure sensitive adhesive tape 400 includes a silicone support 401 coated on opposing sides with a PSAP 402 prepared by curing the PSAC described above. This pressure sensitive adhesive tape 400 structurally adheres the insulating glass unit 302 to the frame 301.

EXAMPLES

These examples are intended to illustrate the invention to one skilled in the art and should not be interpreted as limiting the scope of the invention set forth in the claims.

Reference Example 1

180 Degree Peel Adhesion Testing

This test method is based on ASTM C794 Standard Test Method for Adhesion-in-Peel of Elastomeric Joint Sealants with a primed stainless steel screen substrate having a width of ½". The substrate is prepared by cleaning with isopropanol. The PSAC is applied to a closed cell silicone foam extrusion and fixtured to the substrate with a specified pressure and dwell time, and the substrate is laminated to the extrusion. The resulting peel adhesion sample is then placed in a mechanical testing machine. The peel adhesion sample is clamped into place with clamps and then pulled at 2 inches/minute at a 180° angle. The sample is pulled for a total of one inch. The force per inch of width (pounds per linear inch, pli) and % cohesive failure are recorded.

Reference Example 2

Tab Adhesion

The substrate is prepared by cleaning with isopropanol. The PSAC is applied to a foam support and fixtured to the substrate with a specified pressure and dwell time. The sample is pulled by hand at approximately a 90 degree angle. The % cohesive failure (% CF) is recorded.

Reference Example 3

Mechanical Properties Testing for Tensile Adhesion (TA) Joints

Standard tensile, elongation, and modulus are measured on samples prepared similar to ASTM C 1135. Samples are prepared by applying PSAC to the closed cell silicone foam extrusion and then assembling a joint with a specified pressure and dwell time. The substrates are cleaned with isopropanol prior to assembly. The specimens are them pulled using a mechanical testing machine (Load cell=1000 lb., crosshead speed (pull rate)=4 inches per minute per inch of width).

Components Used in Preparing PSAC Samples

The following components are used in these examples.

Component (A1) comprises an MQ resin core with hydroxy-functional polydimethylsiloxane groups bonded thereto. Component (A1) contains 0.75% hydroxyl groups. Component (A1) is prepared by combining a hydroxy end-blocked polydimethylsiloxane, a trimethylsilyl, hydroxy-functional MQ resin solution and xylene in a reactor at 72 percent non-volatile content. The reaction mixture is heated at 115° C. while anhydrous ammonia gas is passed through the combination to promote the condensation "bodying" reaction. The bodying reaction takes place over a period of several hours. Water is removed during the bodying reaction. Volatile species such as xylene are then stripped.

Component (A2) comprises an MQ resin core with hydroxy-endblocked polydimethylsiloxane groups bonded thereto. Component (A2) contains 0.75% hydroxyl groups. Component (A2) is prepared by combining xylene, a trimethylsilyl, hydroxy-endblocked MQ resin, hydroxy-terminated polydimethylsiloxane gum, silyl phosphate in cyclic polyorganosiloxanes, and nonanoic acid in a reactor, heating the resulting combination to reflux, cooling, and filtering.

Component (B1) comprises a trimethyl endcapped MQ resin containing 0.70% hydroxyl groups. The trimethyl endcapped MQ resin is prepared by combining xylene, a trimethylsilyl, hydroxy-endblocked MQ resin and trifluoroacetic acid in a reactor, heating the resulting combination at 65° C. and adding hexamethyldisilazane. Upon completion of the hexamethyldisilazane addition, the reactor contents are held at 65° C. for two hours and then cooled. Isopropanol and water are added to the reactor contents, and water is removed. Xylene is then stripped.

Component (C1) comprises trimethoxysilylethyl-terminated polydimethylsiloxane.

Component (C2) comprises hydroxy-terminated polydimethylsiloxane.

Component (D1) comprises methyltrimethoxysilane.

Component (D2) comprises (ethylenediaminepropyl)trimethoxysilane.

Component (D3) comprises isobutyltrimethoxysilane.

Component (E1) comprises diisopropoxytitanium bis(ethylacetoacetate)

Component (F1) comprises heptane.

Component (F2) comprises xylene.

Example 1

PSAC samples are prepared by mixing the components in the percentages shown in Table 1. The (B)/(A) ratio and resin/polymer ratio are also shown in Table 1. Each PSAC sample is applied to both sides of a support having dimensions ¼"×11/16"×2", solvent is removed, and the resulting tape is sandwiched between glass plates at 2 psi for 45 minutes. Tab adhesion is evaluated by the method of Reference Example 2 after 4 hours and after 7 days. The results are in Table 1.

TABLE 1

| Component | Sample 1 | Comparative Sample 2 | Sample 3 | Comparative Sample 4 |
|---|---|---|---|---|
| A1 | 26.74% | 46.88% | 35.34% | 33.37% |
| B1 | 19.16% | 0.00% | 11.93% | 11.26% |
| C1 | 10.40% | 2.89% | 5.89% | 11.12% |
| D1 | 9.51% | 9.26% | 9.42% | 8.90% |
| D2 | 0.18% | 0.17% | 0.18% | 0.17% |
| E1 | 0.89% | 0.87% | 0.88% | 0.83% |
| F1 | 26.74% | 39.93% | 32.39% | 30.59% |
| F2 | 6.39% | 0.00% | 3.98% | 3.75% |
| (B)/(A) | 0.72 | 0 | 0.34 | 0.34 |
| Resin/polymer | 2.2 | 2.2 | 2.4 | 1.8 |
| Tab Adhesion after 4 hours | 0% CF | 0% CF | 50% CF | 0% CF |
| Tab Adhesion after 7 days | 50% CF | 0% CF | 90% CF | 0% CF |

Comparative sample 2 shows that when the treated resin is eliminated from a PSAC, the resulting PSAP may have insufficient adhesion for structural applications. Comparative sample 4 in further shows that when the resin/polymer ratio is too low in a PSAC, the resulting PSAP may have insufficient adhesion for structural applications. Samples 1 and 3 show that when the (B)/(A) ratio and the resin/polymer ratio are appropriately selected, the resulting PSAP may have sufficient adhesion for structural applications.

Example 2

PSAC samples are prepared by mixing the components in the percentages shown in Table 2. The (B)/(A) ratio and resin/polymer ratio are also shown in Table 2. Each PSAC sample is applied to both sides of a support having dimensions ¼"×11/16"×2", solvent is removed, and the resulting tape is sandwiched between glass plates. Each PSAC is again applied to both sides of a support, and the resulting tape is sandwiched between a glass plate and a DURANAR® surface. DURANAR® is a fluororesin based paint, which is commercially available from PPG Industries, Inc., of Pittsburgh, Pa., U.S.A. Tensile adhesion is evaluated by the method of Reference 3 after 7 days. The results are in Table 2.

TABLE 2

| Component | Sample 5 | Comparative Sample 6 |
|---|---|---|
| A1 | 6.03% | 6.42% |
| B1 | 27.89% | 24.87% |
| C1 | 12.06% | 12.83% |
| D1 | 3.02% | 3.21% |
| D2 | 1.51% | 1.60% |
| D3 | 5.03% | 5.35% |
| E1 | 1.01% | 1.07% |
| F1 | 34.17% | 36.36% |
| F2 | 9.30% | 8.29% |
| (B)/(A) | 4.63 | 3.88 |
| Resin/polymer | 2.36 | 2.03 |
| Tensile adhesion with 2 glass surfaces (psi) | 98/10% CF | 60/0% CF |
| Tensile adhesion with 1 glass & 1 DURANAR ® surface (psi) | 92/80% CF | 81/0% CF |

Example 2 shows that when relatively high amounts of treated MQ resin are used in combination with low amounts of bodied resin, it may be advantageous to use a relatively high resin/polymer ratio for some PSAC formulations.

Example 3

PSAC samples are prepared by mixing the components in the percentages shown in Table 3. The (B)/(A) ratio and resin/polymer ratio are also shown in Table 3. Each PSAC sample is applied to both sides of a support having dimensions ¼"×¾"×2", solvent is removed, and the resulting tape is sandwiched between two glass plates at 5 psi for 15 minutes, between an aluminum surface and a DURANAR® surface, and between two aluminum surfaces. Tensile adhesion is evaluated by the method of Reference Example 3 after various times. Tab adhesion is evaluated by the method of Reference Example 2 after various times. The results are in Table 3.

TABLE 3

| Component | Sample 7 | Sample 8 |
|---|---|---|
| A1 | 29.67 | 0 |
| A2 | 0 | 28.79 |
| B1 | 21.33 | 25.16 |
| C1 | 11.38 | 8.07 |
| D1 | 9.36 | 9.34 |

TABLE 3-continued

| Component | Sample 7 | Sample 8 |
|---|---|---|
| E1 | 1.09 | 1.06 |
| F1 | 19.78 | 0 |
| F2 | 7.11 | 27.58 |
| (B)/(A) | 0.72 | 0.87 |
| Resin/polymer | 2.22 | 2.21 |
| Tensile adhesion with 1 aluminum and 1 DURANAR ® surface after 1 hour | 58 psi/ 0% CF | 34 psi/ 0% CF |
| Tensile adhesion with 1 aluminum and 1 DURANAR ® surface after 1 day | 105 psi/ 75% CF | 132 psi/ 100% CF |
| Tab adhesion with 2 glass substrates after 4 hours | 0% CF | 0% CF |
| Tab adhesion with 2 glass substrates after 1 day | 100% CF | 100% CF |
| Tab adhesion with 2 glass substrates after 7 days | 100% CF | 100% CF |
| Tab adhesion with 2 aluminum substrates after 4 hours | 0% CF | 0% CF |
| Tab adhesion with 2 aluminum substrates after 1 day | 100% CF | 100% CF |
| Tab adhesion with 2 aluminum substrates after 7 days | 100% CF | 100% CF |

Example 3 shows that different bodied MQ resins are effective as component (A).

Example 4

PSAC samples are prepared by mixing the components in the percentages shown in Table 4. The (B)/(A) ratio and resin/polymer ratio are also shown in Table 4. Each PSAC sample is applied to both sides of a support having dimensions ¼"×¾"×2", solvent is removed, and the resulting tape is sandwiched between two glass plates at 5 psi for 15 minutes and between two aluminum surfaces. Tab adhesion is evaluated by the method of Reference Example 2 after various times. The results are in Table 4.

TABLE 4

| Component | Sample 9 | Sample 10 |
|---|---|---|
| A1 | 23.92% | 23.92% |
| B1 | 17.20% | 17.20% |
| C1 | 9.17% | 0.00% |
| C2 | 0.00% | 9.17% |
| D1 | 8.47% | 8.47% |
| E1 | 0.88% | 0.88% |
| F1 | 34.64% | 34.64% |
| F2 | 5.73% | 5.73% |
| (B)/(A) | 0.72 | 0.72 |
| Resin/polymer | 2.22 | 2.22 |
| Tab adhesion with 2 glass substrates after 4 hours | 0% CF | 0% CF |
| Tab adhesion with 2 glass substrates after 3 days | 75% CF | 10% CF |
| Tab adhesion with 2 glass substrates after 21 days | 100% CF | 50% CF |
| Tab adhesion with 2 glass substrates after 21 days and then 28 more days with the sample immersed in water | 100% CF | 100% CF |
| Tab adhesion with 2 aluminum substrates after 4 hours | 10% CF | 10% CF |
| Tab adhesion with 2 aluminum substrates after 3 days | 100% CF | 75% CF |
| Tab adhesion with 2 aluminum substrates after 21 days | 100% CF | 90% CF |
| Tab adhesion with 2 aluminum substrates after 21 days and then 28 more days with the sample immersed in water | 0% CF | 0% CF |

Example 4 shows that polydiorganosiloxanes terminated with different condensation reactable groups are effective as component (C).

Example 5

A PSAC sample is prepared by mixing the components in the percentages shown in Table 5. The (B)/(A) ratio and resin/polymer ratio are also shown in Table 5. The PSAC sample is applied to both sides of a support having dimensions ¼"×¹¹⁄₁₆"×2", solvent is removed, and the resulting tape is sandwiched between a glass surface and a DURANAR® surface. Tensile adhesion is measured according to reference example 3 after various times. The results are in Table 5.

TABLE 5

| Component | Sample 11 |
|---|---|
| A1 | 8.86% |
| B1 | 40.52% |
| C1 | 17.71% |
| D1 | 4.43% |
| D2 | 0.22% |
| D3 | 7.38% |
| E1 | 1.48% |
| F1 | 5.90% |
| F2 | 13.51% |
| (B)/(A) | 4.58 |
| Resin/polymer | 2.34 |
| Tensile adhesion after 1 hour (psi) | 28 |
| Tensile adhesion after 7 days (psi)/% CF | 127/100% CF |
| Tensile adhesion after the support was packaged in vacuum sealed foil pouches and stored at −30° C. for 1 month (psi)/% CF | 127/100% CF |
| Tensile adhesion after the support was packaged in vacuum sealed foil pouches and stored at −30° C. for 3 months (psi)/% CF | 128/100% CF |
| Tensile adhesion after the support was packaged in vacuum sealed foil pouches and stored at −30° C. for 3 months (psi) (second sample at these conditions)/% CF | 136/100% CF |

Sample 11 shows that the PSACs of this invention can be used to make 1-part prefabricated tapes that can be stored at low temperatures.

Example 6

PSAC samples are prepared by mixing the components in the percentages shown in Table 6. The (B)/(A) ratio and resin/polymer ratio are also shown in Table 6. Each PSAC sample is applied to both sides of a support having dimensions ¼"×¹¹⁄₁₆"×2", solvent is removed, and the resulting tape is sandwiched between a glass surface and a DURANAR® surface. Tab adhesion is measured according to reference example 2 after various times. The results are in Table 6.

TABLE 6

| Component | Comparative Sample 12 | Sample 13 |
|---|---|---|
| A1 | 0% | 26.79% |
| B1 | 45.3% | 19.2% |
| C1 | 20.6% | 10.42% |
| D1 | 3.5% | 9.52% |
| E1 | 0.5% | 0.89% |
| F1 | 15% | 26.79% |
| F2 | 15.10% | 6.4% |
| (B)/(A) | Not applicable | 0.72 |
| Resin/polymer | 2.2 | 2.2 |
| Tab adhesion after 1 day | 50% CF | 90% CF |
| Tab adhesion after 2 days | 100% CF | 100% CF |
| Tab adhesion after 5 days | 10% CF | 100% CF |

Example 6 shows that when the bodied resin is eliminated, peel adhesion may decrease over time.

Example 7

2 Part PSAC

A two part PSAC contains Part A and Part B. Part A is prepared by mixing the components in the percentages shown in Table 7. Part B is prepared by mixing the components in the percentages shown in Table 7. Equal weights of Part A and Part B are mixed together.

TABLE 7

| Component | Part A | Part B | Combination |
|---|---|---|---|
| A1 | 0% | 80% | 40.66 |
| B1 | 57.93% | 0% | 29.44 |
| C1 | 30.74% | 0% | 15.63 |
| D1 | 4.85% | 0% | 2.47 |
| E1 | 3.24% | 0% | 1.64 |
| F1 | 3.24% | 20% | 10.16 |
| (B)/(A) | n/a | n/a | 0.72 |
| Resin/polymer | 1.88 | 2.70 | 2.22 |

Part A and Part B are shelf stable for a period of time under ambient conditions.

Example 8

Comparison of the Structural Adhesive Tape of This Invention and a Commercially Available Structural Adhesive Tape A structural adhesive tape including the PSAC of this invention (silicone structural adhesive tape) and a closed cell acrylic foam tape marketed as 3M VHB from 3M in India (acrylic foam tape) were tested for shear strength on glass. All tape samples tested were ½ inch wide. The silicone structural adhesive tape was ¼ inch thick, and the acrylic foam tape was 2.3 mm thick.

The acrylic foam tape suffers from the disadvantage of requiring a primer on glass to maintain adhesion to glass through water immersion. Shear samples of the acrylic foam tape were fabricated with no primer and with primer to compare the differences. The silicone structural adhesive tape provides the advantage of not requiring primer on glass, and only one set of samples was fabricated.

The each shear sample fabricated had a contact surface on parallel plates of glass of ½"×2" or exactly 1 square inch of contact area. The samples were fabricated at laboratory conditions and were allowed to condition for 7 days before testing. The samples were placed in a tensile testing machine and the parallel glass plates were pulled apart at 1 inch per minute placing the tape systems in a shear mode. The ultimate stress and mode of failure to the glass were recorded as noted in Table 8 below. The conditions chosen were according to the conditions specified in the ASTM C1184 Standard Specification for Structural Sealants.

TABLE 8

| | Acrylic foam tape with no primer | | Acrylic foam tape with primer | | Silicone structural adhesive tape | |
|---|---|---|---|---|---|---|
| | Peak stress psi | Mode of failure | Peak stress psi | Mode of failure | Peak stress psi | Mode of failure |
| 7 d/RT | 80.5 | Adhesive | 68.6 | Adhesive | 105.0 | 94% cohesive |
| 7 d/RT + 7 d/H2O | 52.2 | Adhesive | 75.4 | 24% cohesive | 115.1 | 82% cohesive |
| 7 d/RT + 1 hr at 88° C. | 32.7 | Adhesive | 29.9 | Adhesive | 83.9 | 84% cohesive |
| 7 d/RT + 1 hr at −29° C. | 120.6* | Adhesive | 209.8 | Adhesive | 156.1 | 100% cohesive |

*The data in Table 8 represents the average of 5 specimens at each condition with the exception of the data point marked with an asterisk. This point is an average of four samples due to glass breakage during testing.

In the table above, 7d/RT means the sample sat for 7 days at room temperature under ambient conditions. 7d/H2O means the sample was immersed in water for 7 days at room temperature.

The ASTM C1184 requirement is that products intended to be used in structural glazing applications must have a minimum of 50 psi or 345 kPa in all conditions noted above along with 5000 hrs of accelerated aging according to the conditions specified in ASTM C1442. These data further shows that the silicone tape system has better stability in the temperature range of −29° C. to 88° C. and through water immersion without the use of primers than the acrylic foam tape system.

INDUSTRIAL APPLICABILITY

Without wishing to be bound by theory it is thought that the combination of the (B)/(A) ratio and the resin/polymer ratio provides the benefits of i) improved tack (green strength) of the PSAC after solvent removal and ii) long term-permanent bonding of the PSAP prepared by curing the PSAC after solvent removal. Without wishing to be bound by theory, it is thought that when the PSAP prepared by curing the PSAC will be used in a structural attachment application, components (D) and (E) are present.

The pressure sensitive adhesive tape made from the PSAC of this invention and a closed cell silicone foam support is useful in structural glazing applications, such as for spacers between glass panes or in curtain wall applications. Without wishing to be bound by theory, it is thought that the PSAP may provide sufficient adhesive strength for structural attachment applications, while the silicone foam may provide benefits including increased thermal resistance resulting in better energy efficiency and reduced sound transmission from the exterior to the interior resulting in less noisy interior conditions; and the pressure sensitive adhesive tape may provide the benefit of reduced mullion width resulting in improved appearance.

DRAWINGS

Figure 1:
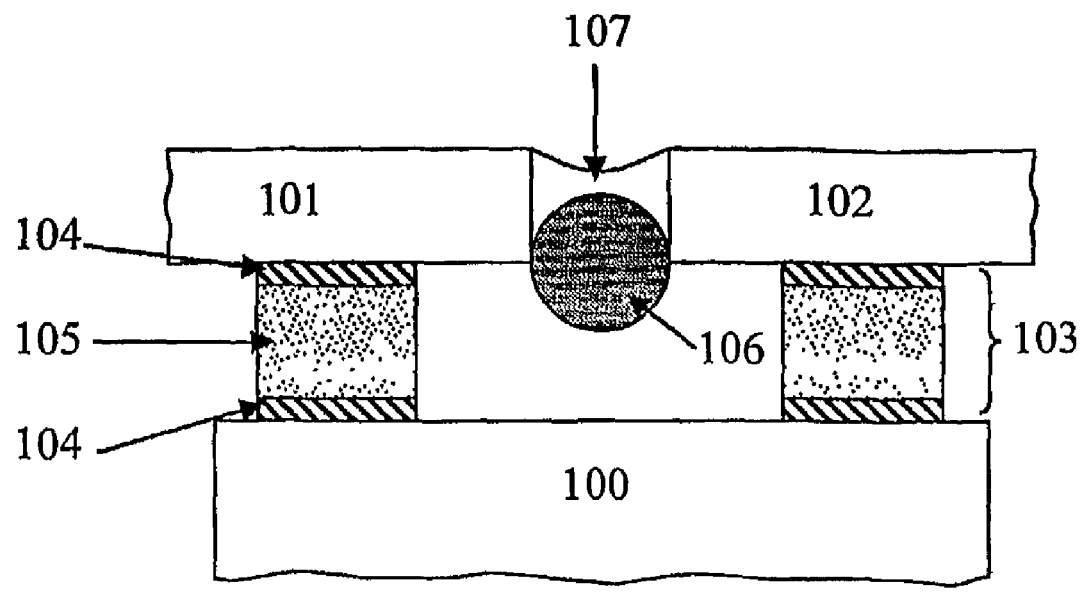
FIG. 1 shows a portion of a cross section of a curtain wall including a pressure sensitive adhesive tape.
Figure 2:
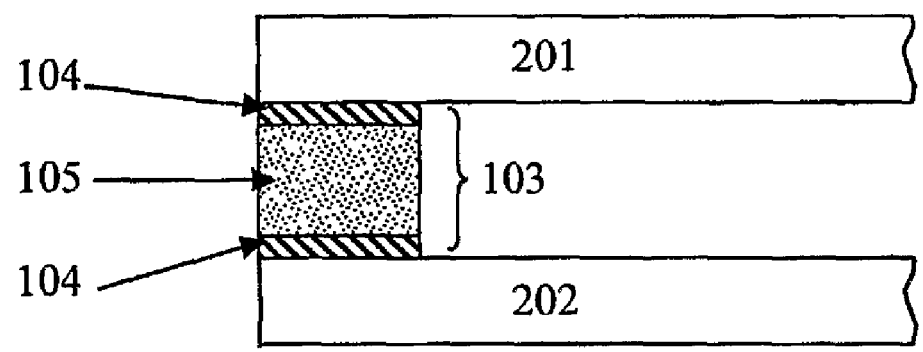
FIG. 2 is a portion of an insulating glass unit including a pressure sensitive adhesive tape.
Figure 3:
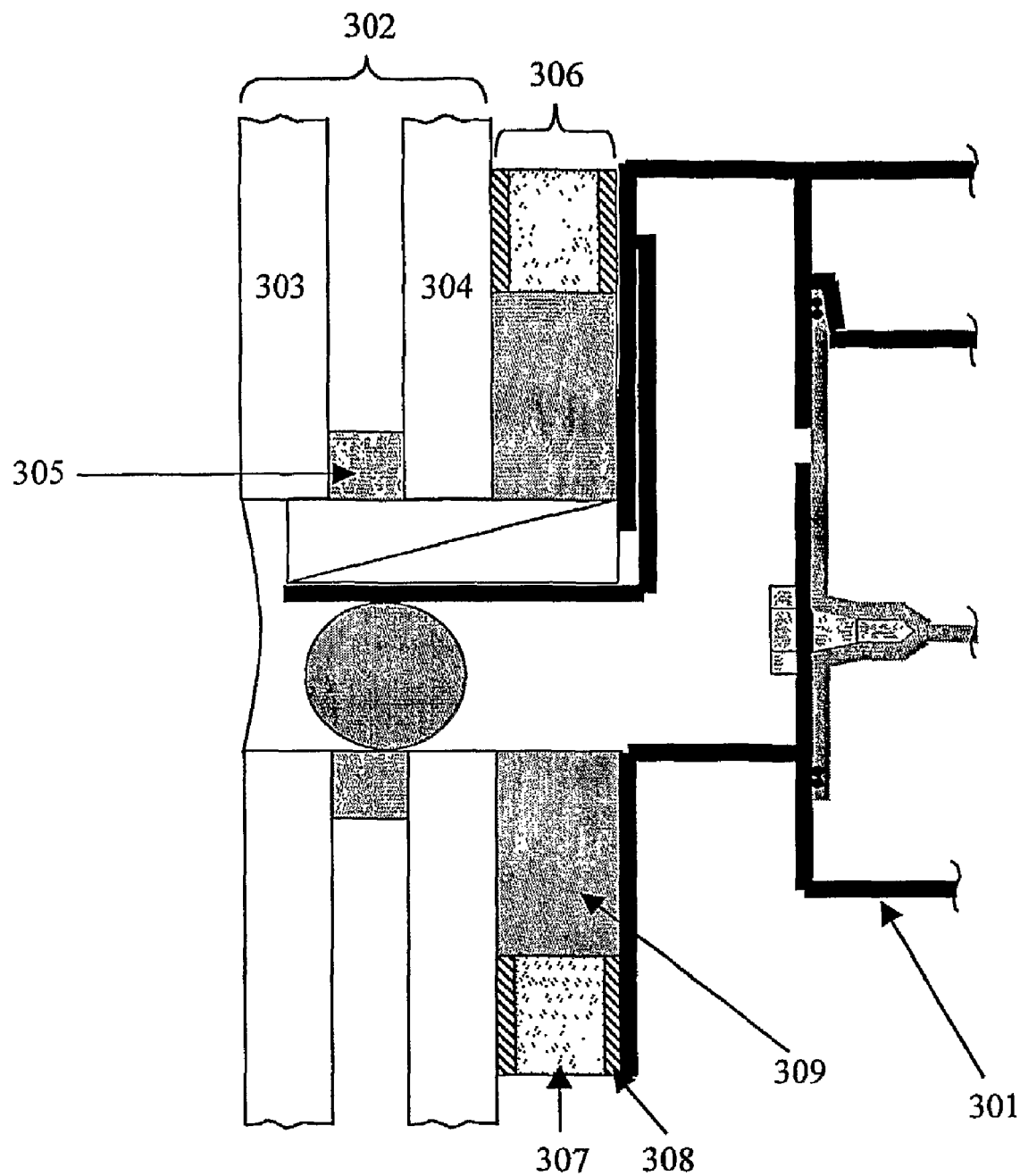
FIG. 3 shows a portion of a curtain wall unit of the prior art.
Figure 4:
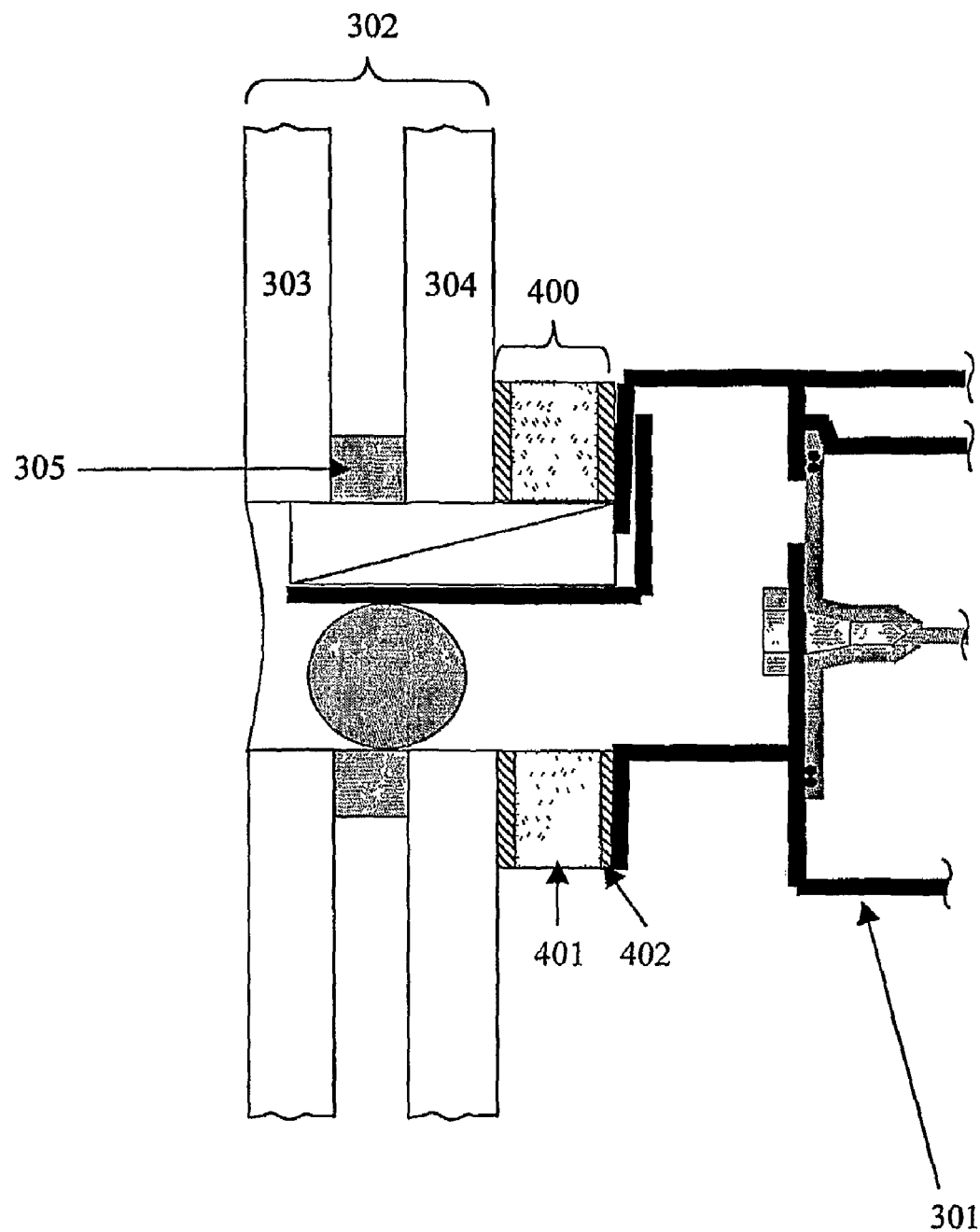
FIG. 4 shows a portion of a curtain wall unit of this invention having an improved appearance.

REFERENCE NUMERALS 100 frame member
101 curtain wall panel
102 curtain wall panel
103 pressure sensitive adhesive tape
104 pressure sensitive adhesive product
105 silicone foam support
106 backer rod
107 weather sealant
201 glass pane
202 glass pane
301 frame
302 insulating glass
303 glass pane
304 glass pane
305 spacer
306 temporary adhesive
307 support
308 nonstructural adhesive
309 structural adhesive composition
400 pressure sensitive adhesive tape
401 silicone support
402 PSAP

The invention claimed is:

1. A pressure sensitive adhesive composition comprising:
   (A) a bodied MQ resin comprising
      (i) a resinous core and
      (ii) a nonresinous polyorganosiloxane group, where the nonresinous polyorganosiloxane group is terminated with a silicon-bonded hydroxyl group;
   (B) a treated MQ resin comprising a trimethylsilyl-terminated MQ resin, where (B)/(A) ratio has a value of 0.3 to 5.0, and
   (C) a polydiorganosiloxane terminated with a condensation reactable group;
   where resin/polymer ratio has a value of 2.0 to 3.0;
   optionally (D) a crosslinker;
   optionally (E) a catalyst; and
   optionally (F) a solvent.

2. The pressure sensitive adhesive composition of claim 1, where component (A)(ii) is a hydroxy-terminated polydimethylsiloxane group.

3. The pressure sensitive adhesive composition of claim 1, where component (C) is an alkoxysilylhydrocarbylene-endblocked polydiorganosiloxane.

4. The pressure sensitive adhesive composition of claim 1, where component (C) has formula: $(R^5)_{3-y}R^4_y SiO-(R^4_2SiO)_x-SiR^4_y(R^5)_{3-y}$, where each $R^4$ is independently a substituted or unsubstituted monovalent hydrocarbon group, each $R^5$ independently comprises a halogen atom, an acetamido group, an acetoxy group, an acyloxy group, an alkoxy group, an amido group, an amino group, an aminoxy group, a hydroxyl group, an oximo group, a ketoximo group, a methylacetamido group, or an alkoxysilylhydrocarbylene group, x is an integer having a value of 200 to 1,000 and y is 0, 1, or 2.

5. The pressure sensitive adhesive composition of claim 4, where each $R^4$ is an alkyl group, each $R^5$ is a hydroxyl group or a trialkoxysilethylene group, x is 500 to 700; and y is 0.

6. The pressure sensitive adhesive composition of claim 1, where component (D) is present and is a trialkoxysilane.

7. The pressure sensitive adhesive composition of claim 1, where component (E) is present and is a titanium catalyst.

8. The pressure sensitive adhesive composition of claim 1, where component (F) is present and is a hydrocarbon liquid.

9. A kit comprising:
   (I) the composition of claim 1, and
   (II) a support.

10. A method comprising:
    (1) applying to opposing sides of a support a composition comprising;
        (A) a bodied MQ resin comprising
            (i) a resinous core and
            (ii) a nonresinous polyorganosiloxane group where the nonresinous polyorganosiloxane group is terminated with a silicon-bonded hydroxyl group;
        (B) a treated MQ resin comprising a trimethylsilyl-terminated MQ resin, where (B)/(A) ratio has a value of 0.3 to 5.0, and
        (C) a polydiorganosiloxane terminated with a condensation reactable group;
        where resin/polymer ratio has a value of 2.0 to 3.0;
        optionally (D) a crosslinker;
        optionally (E) a catalyst; and
        optionally (F) a solvent;
    optionally (2) removing component (F),
    where the composition is applied on each opposing side in an amount sufficient to provide on each opposing side a layer having a thickness of at least 3 mils after removal of component (F).

11. A pressure sensitive adhesive tape prepared by the method of claim 10.

12. The pressure sensitive adhesive tape of claim 11, where the support is a silicone elastomer having a durometer hardness of 25 to 70.

13. The method of claim 10, further comprising:
    (3) interposing the product of step (2) between surfaces,
    (4) applying pressure to the product of step (2),
    (5) curing the layers.

14. The pressure sensitive adhesive composition of claim 1, where component (B) has a weight average molecular weight of 3,000 to 40,000.

15. The method of claim 10, where component (B) has a weight average molecular weight of 3,000 to 40,000.

* * * * *